(12) United States Patent
Erwin

(10) Patent No.: US 7,596,833 B2
(45) Date of Patent: Oct. 6, 2009

(54) HOOD HINGE ASSEMBLY FOR VEHICLE

(75) Inventor: Gregory S. Erwin, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 295 days.

(21) Appl. No.: 11/470,265

(22) Filed: Sep. 6, 2006

(65) Prior Publication Data

US 2007/0062748 A1  Mar. 22, 2007

Related U.S. Application Data

(63) Continuation-in-part of application No. 11/230,378, filed on Sep. 20, 2005, now abandoned.

(51) Int. Cl.
*E05D 15/32* (2006.01)
(52) U.S. Cl. ....................................... 16/370
(58) Field of Classification Search ............ 16/370; 180/69.2, 69.21, 274; 296/187.09, 193.11, 296/76, 187.04; 53/510
See application file for complete search history.

(56) References Cited

U.S. PATENT DOCUMENTS 5,394,590 A * 3/1995 Yu ............................. 16/357
6,934,999 B2 * 8/2005 Kreth et al. .................. 16/222
6,953,220 B2 * 10/2005 Takehara ................ 296/187.04
7,303,040 B2 * 12/2007 Green et al. ................ 180/274
2003/0034667 A1 * 2/2003 Willard ...................... 296/108
2005/0257980 A1 * 11/2005 Green et al. ................ 180/274
2007/0151791 A1 * 7/2007 Gust .......................... 180/274

FOREIGN PATENT DOCUMENTS

| DE | 102004007858 A1 | 5/2005 |
| DE | 10035105 B4 | 8/2007 |
| JP | 2004353715 A * | 12/2004 |

* cited by examiner

*Primary Examiner*—Victor Batson
*Assistant Examiner*—Matthew Sullivan

(57) ABSTRACT

A hood hinge assembly for operatively attaching a hood to a vehicle body of a vehicle including a base adapted to be operatively fixed to the vehicle. The hood hinge assembly also includes an actuator link adapted for pivotal attachment to the hood at a first pivot point and a mount link pivotally attached to the actuator link at a second pivot point. The hood hinge assembly includes a lever link pivotally attached to the mount link at a third pivot point and pivotally attached to the base at a fourth pivot point. The hood hinge assembly further includes an actuator operable to pivot the actuator link, mount link, and the lever link to thereby move the first pivot point away from the vehicle. The hood hinge assembly includes a support link pivotally attached to the mount link at a fifth pivot point. The support link is operable to support the mount link at the fifth pivot point as the mount link pivots about the second pivot point.

13 Claims, 12 Drawing Sheets

US 7,596,833 B2

HOOD HINGE ASSEMBLY FOR VEHICLE

CROSS-REFERENCE TO RELATED APPLICATION(S)

The present application is a continuation-in-part of copending U.S. Ser. No. 11/230,378, filed Sep. 20, 2005.

TECHNICAL FIELD

The present invention relates generally to hinges and, more particularly, to a hood hinge assembly for a vehicle.

BACKGROUND OF THE INVENTION

It is known to attach a hood to a body of a vehicle with a hinge. In many vehicles, the hood hinge allows the hood to be selectively opened for access to an engine and other components in an engine compartment of the vehicle.

However, a hood that is attached with a conventional hinge has several disadvantages. For instance, if an object impacts the vehicle, that object may ultimately impact the hood. Kinetic energy of the object is likely to dissipate by indirect impact with the vehicle engine block, which is typically directly underneath the hood. Indirect impact with the engine in this manner is likely to harm the object. Therefore, a need developed for a hood that could move the hood away from the engine block during a collision such that an impacted object is more likely to deform the hood to dissipate kinetic energy.

Partially in response to this need, hood hinge assemblies have been developed that pivotally attach the hood to the vehicle and that may be deployed to move the hood away from the engine block. However, these hinges can move the hood substantially in the fore and aft direction instead of moving the hood more directly vertical away from the vehicle body. Furthermore, these hood hinge assemblies can be relatively unstable when deployed such that the hood moves in an undesired manner. Furthermore, these movable hinges can be bulky and therefore difficult to incorporate into a vehicle because they can interfere with other components.

Thus, it is desirable to provide an improved movable hinge that moves the hood in a substantially vertical direction away from the vehicle body. It is also desirable to provide a hood hinge assembly that is more stable during deployment. It is further desirable to provide a hood hinge assembly that is more compact. It is still further desirable to provide a hood hinge assembly that controls deployment vertically while still maintaining the rear hood lift path. Therefore, there is a need in the art to provide a hood hinge assembly that meets at least one of these desires.

SUMMARY OF THE INVENTION

Accordingly, the present invention is a hood hinge assembly for operatively attaching a hood to a vehicle body of a vehicle including a base adapted to be operatively fixed to the vehicle. The hood hinge assembly also includes an actuator link adapted for pivotal attachment to the hood at a first pivot point and a mount link pivotally attached to the actuator link at a second pivot point. The hood hinge assembly includes a lever link pivotally attached to the mount link at a third pivot point and pivotally attached to the base at a fourth pivot point. The hood hinge assembly further includes an actuator operable to pivot the actuator link, mount link, and the lever link to thereby move the first pivot point away from the vehicle. The hood hinge assembly includes a support link pivotally attached to the mount link at a fifth pivot point. The support link is operable to support the mount link at the fifth pivot point as the mount link pivots about the second pivot point.

DESCRIPTION OF THE PREFERRED EMBODIMENT

Figure 1:
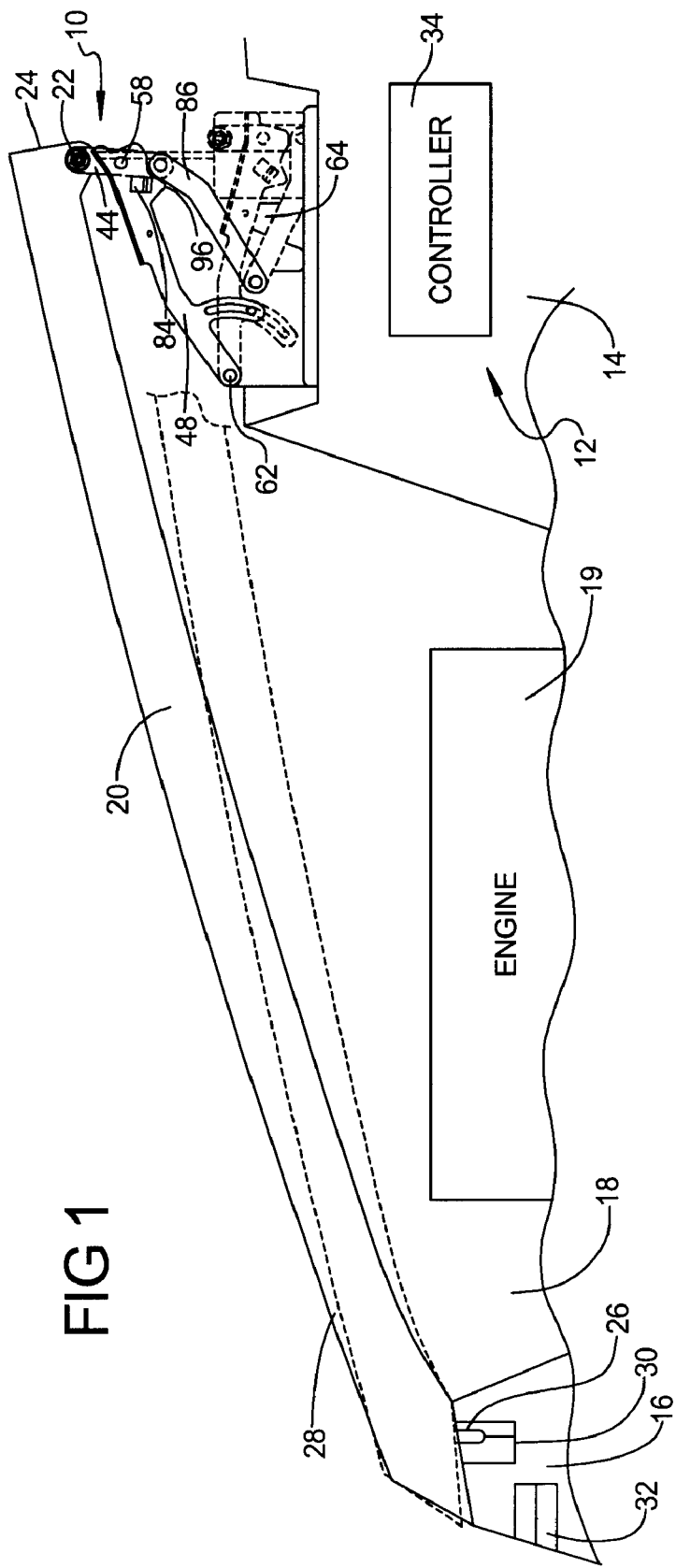
FIG. 1 is an elevational view of a hood hinge assembly, according to the present invention, illustrated in operational relationship with a vehicle in an extended and a retracted position.

Referring to the drawings and in particular FIG. 1, one embodiment of a hood hinge assembly 10, according to the present invention, is shown for a vehicle such as a motor vehicle, generally indicated at 12. Such vehicles 12 typically include a body 14 (partially shown) forming an engine compartment 16. The engine compartment 16 has a recess 18 in which an engine, schematically shown at 19, can be disposed. The vehicle 12 also includes a hood 20 that closes and opens the recess 18. The hood 20 is operatively attached to the vehicle 12 by at least one, and preferably a plurality of laterally spaced hood hinge assemblies 10. It should be appreciated that only one hood hinge assembly 10 is illustrated in FIG. 1 and will be subsequently described. It should also be appreciated that, except for the hood hinge assembly 10, the vehicle 12 is conventional and known in the art.

The hood hinge assembly 10 is adapted for pivotal attachment to the hood 20 at a first pivot point 22. In the embodiment illustrated, the first pivot point 22 is located on a rear corner 24 of the hood 20. The hood 20 also includes a striker 26 illustrated in FIG. 1. In the embodiment illustrated, the striker 26 is longitudinally spaced from the first pivot point 22 and is located on a front end 28 of the hood 20. When the hood 20 is in a closed position (shown in phantom lines in FIG. 1), the hood 20 generally covers the recess 18. In this position, the striker 26 is secured to the body 14 by a latch assembly 30 attached to the body 14. The hood 20 is opened by releasing the striker 26 from the latch assembly 30 and pivotally moving the hood 20 about the first pivot point 22.

The hood hinge assembly 10 can be positioned in a retracted position (shown in phantom lines in FIG. 1), and an extended position (shown in solid lines in FIG. 1). In the retracted position, the hood hinge assembly 10 retains the first pivot point 22 generally adjacent the body 14 for normal opening and closing of the hood 20 as previously described. In the extended position, the hood hinge assembly 10 generally moves the first pivot point 22 away from the body 14 such that the hood 20 pivots about the striker 26, which remains secured to the latch assembly 30.

The vehicle 12 also includes at least one sensor 32, shown schematically in FIG. 1. The sensor 32 is operable to detect when the vehicle 12 impacts an object. The sensor 32 is in communication with a controller 34, also shown schematically in FIG. 1. The controller 34 is in electrical communication with the sensor 32. The controller 34 is operable to receive a signal from the sensor 32, indicating that an object (not shown) has impacted the vehicle 12. In response, the controller 34 transmits a signal to an actuator which fires, causing the hood hinge assembly 10 to move from the retracted position to the extended position in a manner to be described. It should be appreciated that the hood hinge assembly 10 creates space between the hood 20 and the engine 19 such that if an object impacts the vehicle 12, the object can more readily deform the hood 20 to dissipate kinetic energy.

Figure 2:
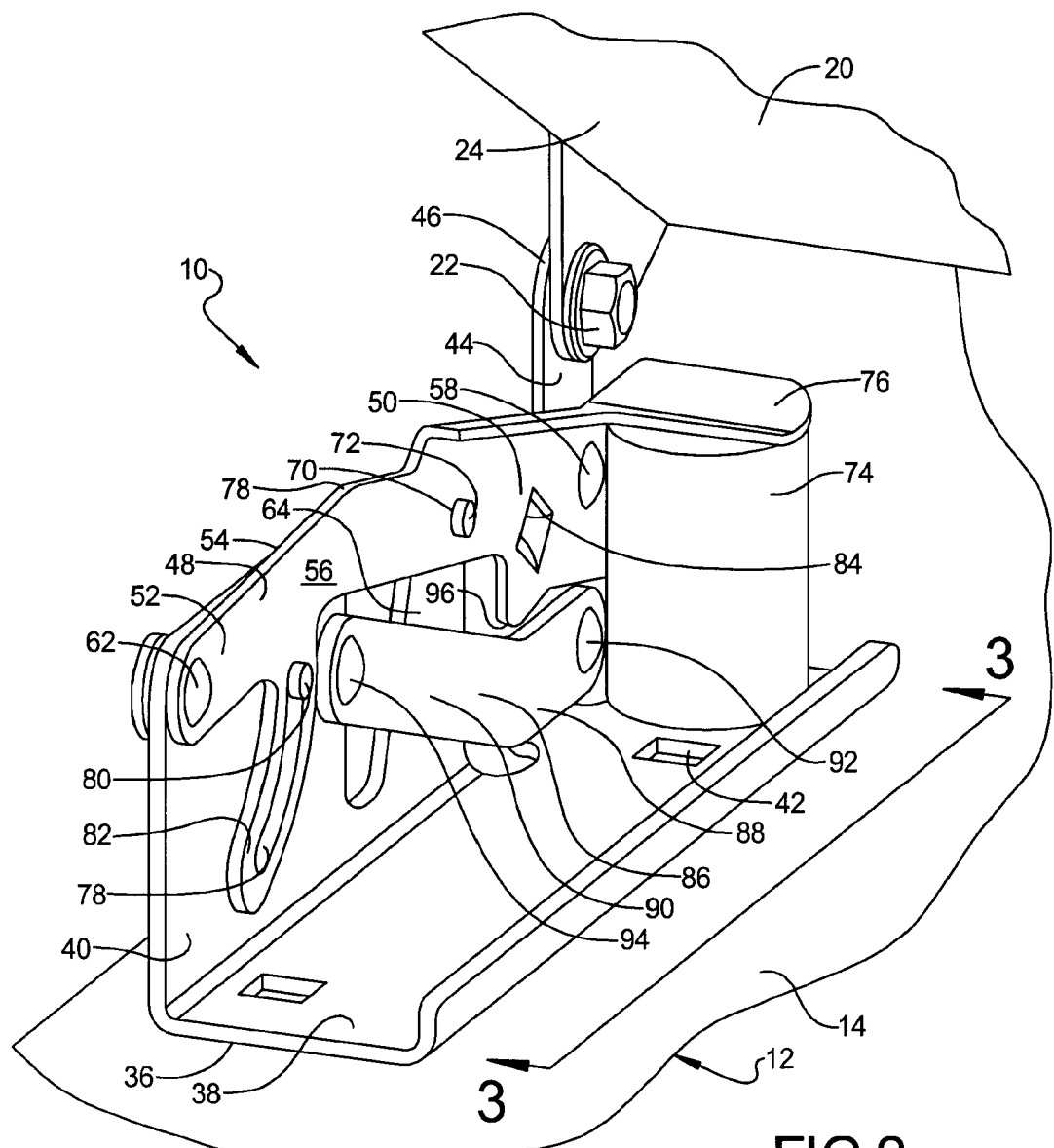
FIG. 2 is a perspective view of the hood hinge assembly of FIG. 1 illustrated in a retracted position.
Figure 3:
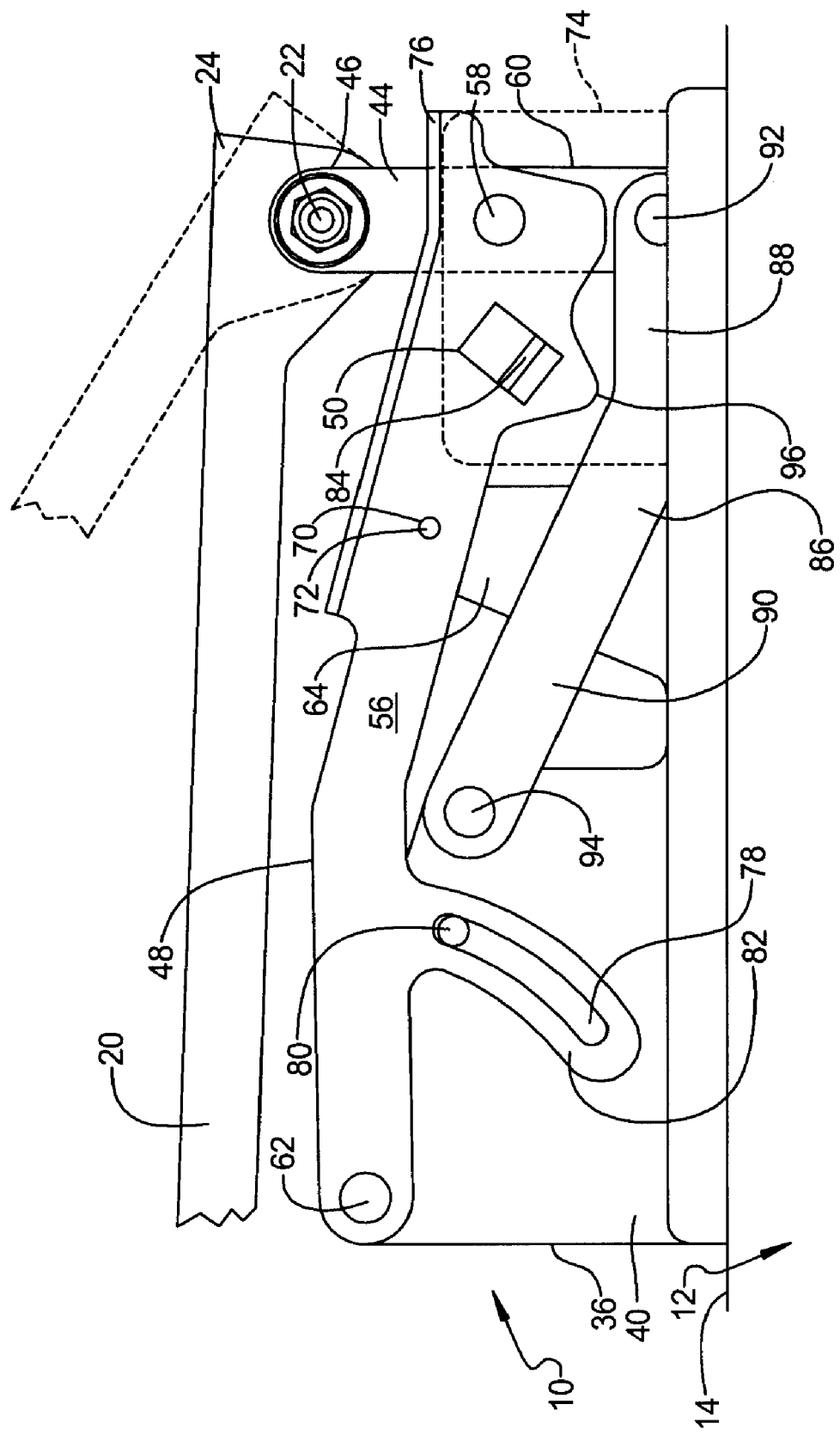
FIG. 3 is an elevational view of the hood hinge assembly of FIG. 1 illustrated in the retracted position and illustrated with a hood of the vehicle in an opened and closed position.
Figure 4:
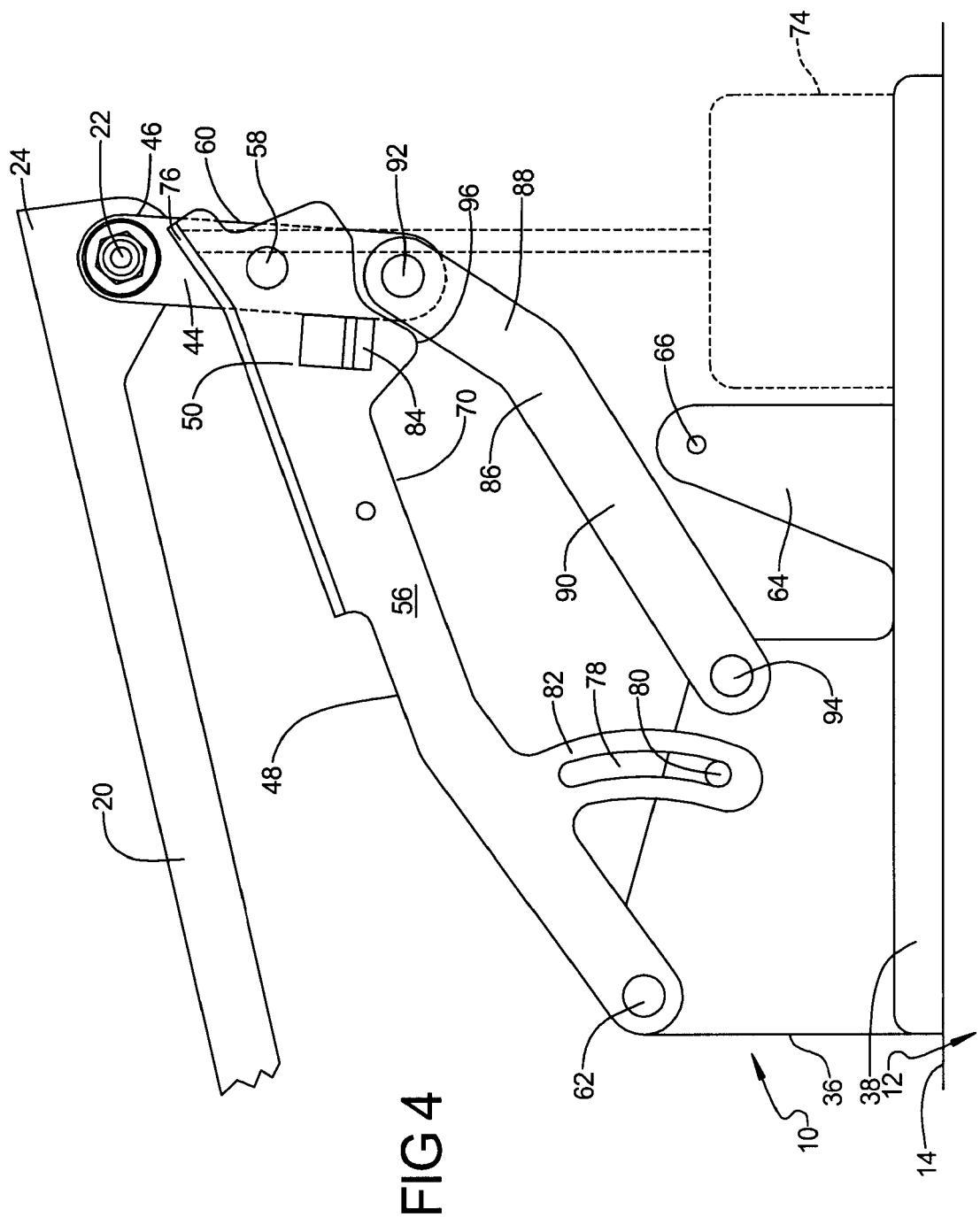
FIG. 4 is an elevational view of the hood hinge assembly of FIG. 1 illustrated in an extended position.
Figure 5:
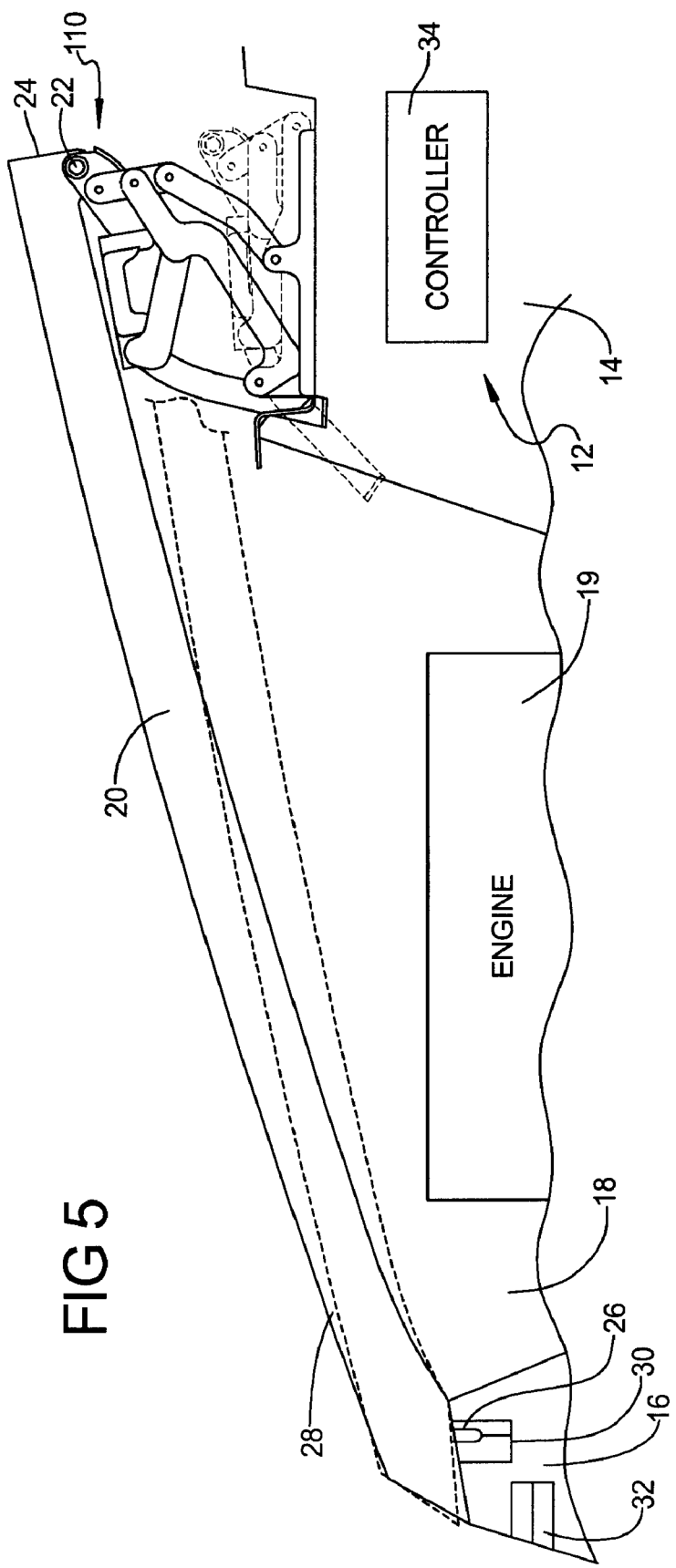
FIG. 5 is an elevational view of another embodiment, according to the present invention, of the hood hinge assembly of FIG. 1 illustrated in operational relationship with a vehicle in an extended and a retracted position.
Figure 6:
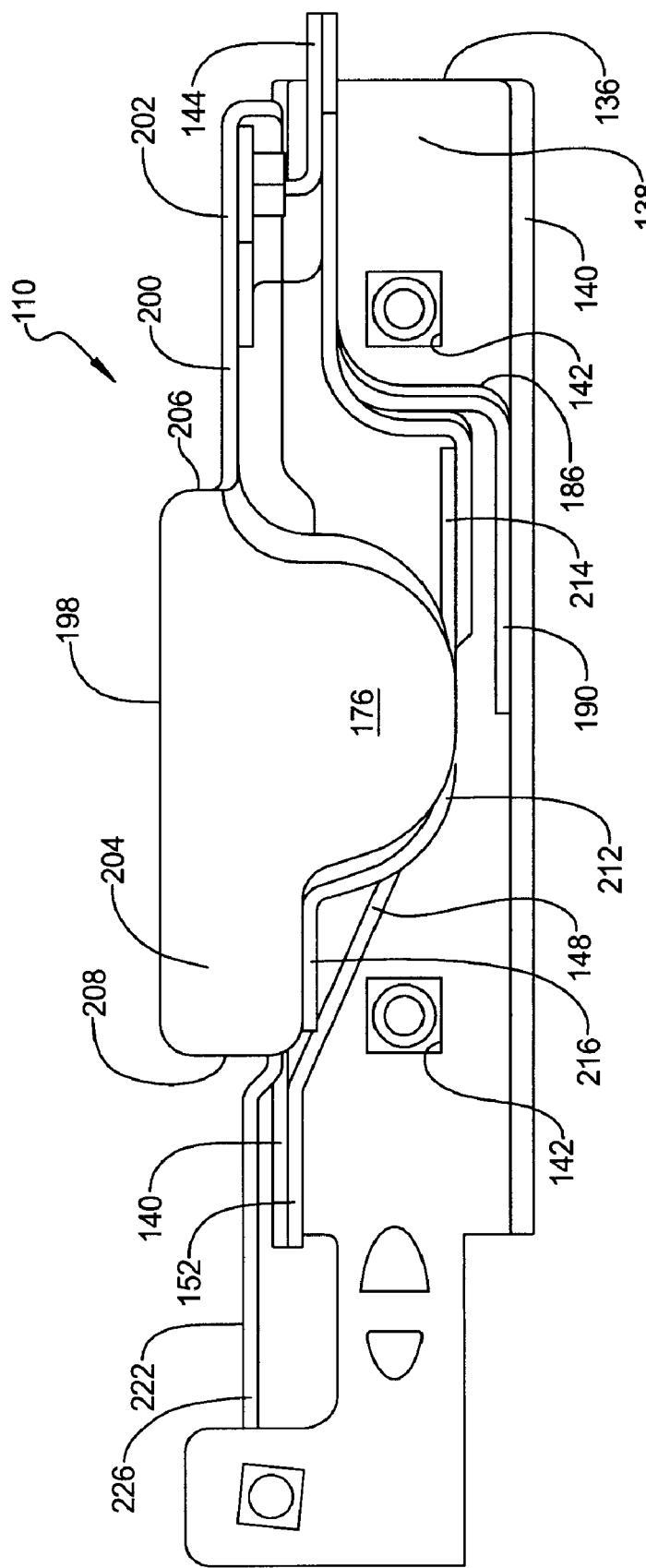
FIG. 6 is a plan view of the hood hinge assembly of FIG. 5 illustrated in a retracted position.
Figure 7:
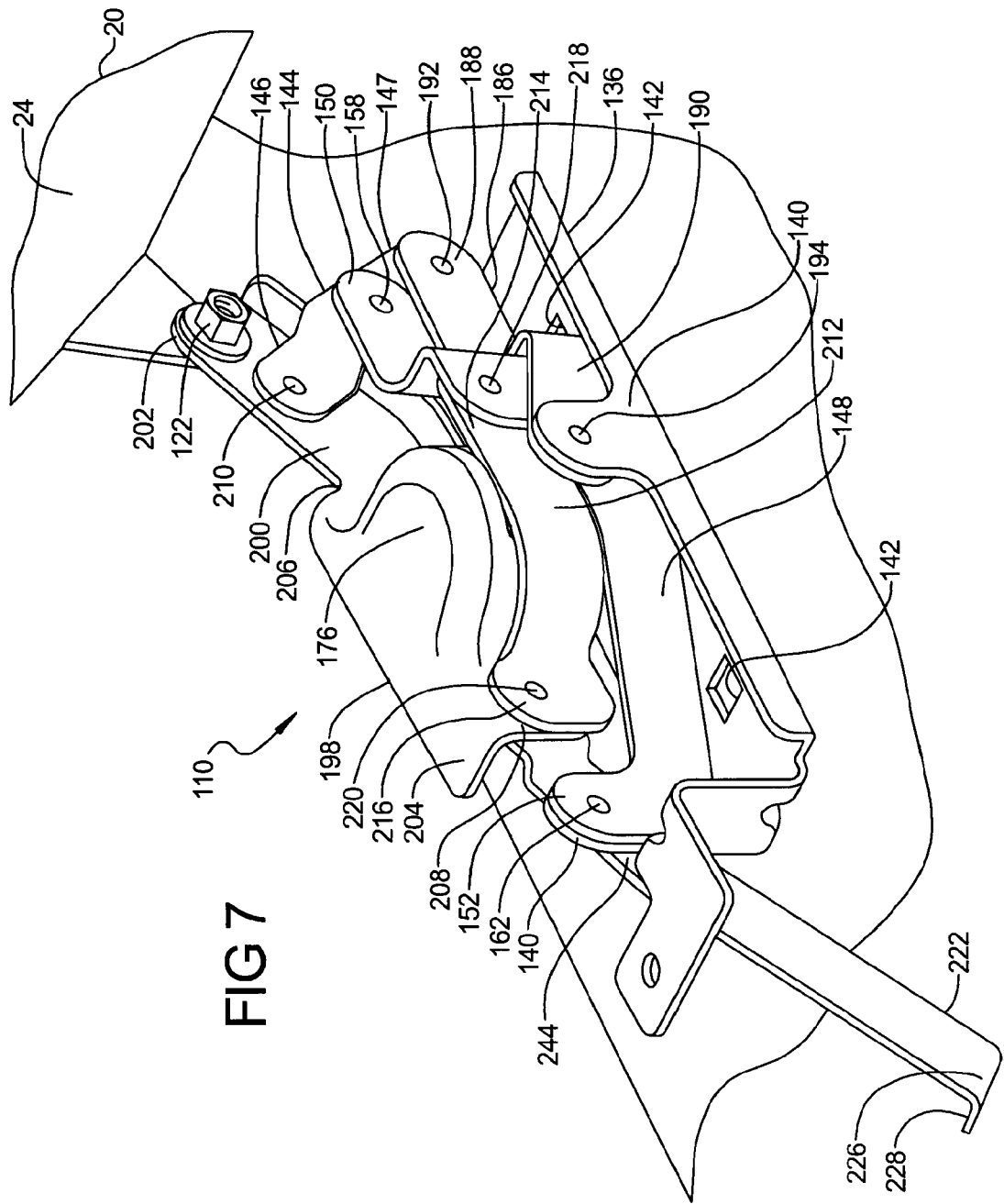
FIG. 7 is a front perspective view of the hood hinge assembly of FIG. 5 illustrated in a retracted position.

As illustrated in FIGS. 2 through 4, the hood hinge assembly 10 includes a base 36. The base 36 is a plate that is bent so as to define a first portion 38 and second portion 40. The second portion 40 is substantially perpendicular to the first portion 38. The first portion 38 includes a plurality of apertures 42 (FIG. 2) used to operatively fix the base 36 to the body 14 by a suitable mechanism such as fasteners (not shown). It should be appreciated that the base 36 could be integral to the body 14.

The hood hinge assembly 10 also includes a mount link or bar 44. The mount bar 44 is generally elongate and is adapted for pivotal attachment to the hood 20. The mount bar 44 defines a first end 46 and the rear corner 24 of the hood 20 is pivotally attached to the first end 46 to define the first pivot point 22 of the hood 20. The mount bar 44 can include any suitable component for pivotally attaching to the hood 20 at the first pivot point 22, such as a hinge pivot weld nut or rivet (not shown).

The hood hinge assembly 10 includes a lever link or bar 48. The lever bar 48 is generally flat and elongate so as to define a first end 50, a second end 52, a first side 54 (FIG. 2), and a second side 56. The first end 50 of the lever bar 48 is pivotally attached to the mount bar 44 so as to define a second pivot point 58. The axis of the second pivot point 58 extends through a middle portion 60 (FIGS. 3 and 4) of the mount bar 44, and the mount bar 44 is adjacent the first side 54 of the lever bar 48. The second end 52 of the lever bar 48 is pivotally attached to the second portion 40 of the base 36 so as to define a third pivot 62. The second portion 40 of the base 36 is substantially coplanar and adjacent to the first side 54 of the lever bar 48. The lever bar 48 may include any suitable component for pivotally attaching to the mount bar 44 and the base 36. In the embodiment illustrated, the mount bar 44 is restricted against substantially all linear movement relative to the lever bar 48 at the second pivot point 58. Likewise, the lever bar 48 is restricted against substantially all linear movement relative to the base 36 at the third pivot point 62. It should be appreciated that the hood hinge assembly 10 is more stable when moving from the retracted position toward the extended position.

The hood hinge assembly 10 also includes a retainer link or bar 64. The retainer bar 64 is generally planar and is fixed to the base 36. In the embodiment illustrated, the retainer bar 64 is integrally attached to the base 36 and extends perpendicularly from the first portion 38 of the base 36. The retainer bar 64 is operable to be secured to the lever bar 48 to thereby retain the lever bar 48 against pivoting about the third pivot point 62. In the embodiment illustrated, the retainer bar 64 includes an aperture 66 (FIG. 4) extending through the retainer bar 64. The lever bar 48 also includes an aperture 70 that is aligned with the aperture 66 when the hood hinge assembly 10 is in the retracted position.

The hood hinge assembly 10 further includes a pin 72 (FIG. 3). When the hood hinge assembly 10 is in the retracted position, the pin 72 extends through both the aperture 66 (FIG. 4) of the retainer bar 64 and the aperture 70 of the lever bar 48 to thereby secure the lever bar 48 to the retainer bar 64. The pin 72 is also operable to release the lever bar 48 so that the lever bar 48 is free to pivot about the third pivot point 62 and move the hood hinge assembly 10 toward the extended position.

The hood hinge assembly 10 also includes an actuator 74 (FIG. 2). The actuator 74 is operable to pivot the lever bar 48 about the third pivot point 62 to move the hood hinge assembly 10 from the retracted position toward the extended position. In the embodiment illustrated, the lever bar 48 includes an attachment flange 76 disposed at the first end 50 of the lever bar 48 and extending perpendicularly away from the second side 56 of the lever bar 48. The actuator 74 is operatively attached to the attachment flange 76, such as by a pivotal attachment. The actuator 74 is operable to supply an actuation force to the lever bar 48 to thereby pivot the lever bar 48 about the third pivot point 62. The actuator 74 may be of any suitable type, such as a piston slidably attached to a cylinder or a bellows chamber, which expands due to air introduced into the actuator 74. In one embodiment, the actuation force provided by the actuator 74 is sufficient to destruct the pin 72. In another embodiment, the actuator 74 applies a biasing force to the lever bar 48 away from the base 36 even when the hood hinge assembly 10 is in the retracted position, and hood hinge assembly 10 moves to the extended position only when the pin 72 destructs by some independent mechanism. Also, in one embodiment, the actuator 74 continues to apply force to the lever bar 48 when the hood hinge assembly 10 is in the extended position to hold the hood 20 away from the body 14 during a vehicular collision.

In the embodiment illustrated, at least one of the base 36 and lever bar 48 defines a curved slot 78, and the other of the base 36 and lever bar 48 includes a pin 80 that is disposed within the curved slot 78 as the lever bar 48 pivots about the third pivot point 62. In the embodiment illustrated, the lever bar 48 includes a curved leg 82 extending from the second end 52 of the lever bar 48 and downward toward the base 36. The curved slot 78 is formed in the leg 82. The pin 80 is fixed to the second portion 40 of the base 36. The pin 80 is disposed within the curved slot 78 when the hood hinge assembly 10 is in the retracted position, and as the lever bar 48 pivots about the third pivot point 62, the pin 80 remains inside the curved slot 78. It should be appreciated that abutment between the pin 80 and the curved slot 78 acts as a stop.

The hood hinge assembly 10 also includes a support link or bar 86. The support bar 86 is generally planar and elongate. The support bar 86 includes a first portion 88 and a second portion 90. The second portion 90 is disposed at a positive angle relative to the first portion 88. The first portion 88 of the support bar 86 is pivotally attached to the mount bar 44 at a fourth pivot point 92. The second portion 90 is pivotally attached to the second portion 40 of the base 36 at a fifth pivot point 94. The support bar 86 is generally disposed between the lever bar 48 and the first portion 38 of the base 36. In the embodiment illustrated, the support bar 86 is restricted against substantially all linear movement relative to the mount bar 44 at the fourth pivot point 92. Likewise, the support bar 86 is restricted against substantially all liner movement relative to the base 36 at the fifth pivot point 94. It should be appreciated that the hood hinge assembly 10 is more stable when moving from the retracted position toward the extended position.

When the hood hinge assembly 10 is in the retracted position, the support bar 86 substantially restricts the mount bar 44 from pivoting about the second pivot point 58. Also, as the hood hinge assembly 10 moves toward the extended position, the support bar 86 supports the mount bar 44 by pushing and/or pulling the mount bar 44 at the fourth pivot point 92 as the mount bar 44 pivots about the second pivot point 58. By supporting the mount bar 44 in this manner, the support bar 86 maintains the mount bar 44 in a position substantially perpendicular to the first portion 38 of the base 36 as the hood hinge assembly 10 moves toward the extended position such that the first pivot point 22 moves in a substantially arcuate path in a vertical direction to pivot about the striker 26. It should be appreciated that the rear corner 24 of the hood 20 lifts higher away from the body 14 in a controlled path due to the support bar 86.

The hood hinge assembly 10 also includes at least one stop member operable to limit pivotal movement of the mount bar 44 about the second pivot point 58. In the embodiment illustrated, there is a plurality of stop members to be described that each limits the pivotal movement of the mount bar 44. As will be explained in greater detail below, each of the stop members cause the first pivot point 22 to move in a predetermined direction as the hood hinge assembly 10 moves from the retracted position toward the extended position, thereby moving the hood 20 of the vehicle 12 in a predetermined manner.

In the embodiment illustrated, one stop member is an abutment member 84 operable to abut against the mount bar 44 to thereby limit pivotal movement of the mount bar 44 above the second pivot point 58. In the embodiment illustrated, the lever bar 48 supports the abutment member 84. More specifically, the abutment member 84 is a portion of the lever bar 48 at the first end 50 that is integrally attached to the lever bar 48 at both ends and with a middle portion that bends outward from the first side 54 of the lever bar 48 (FIG. 2). The abutment member 84 is oriented relative to the mount bar 44 such that the mount bar 44 eventually abuts against the abutment member 84 as the mount bar 44 pivots about the second pivot point 58 as illustrated in FIG. 4.

In the embodiment illustrated, another stop member is an abutment surface 96 included on the lever bar 48. As illustrated in FIGS. 3 and 4, the abutment surface 96 is generally curved and projects from the lever bar 48 toward the support bar 86. As the hood hinge assembly 10 moves from the retracted position towards the extended position, the support bar 86 will eventually abut against the abutment surface 96 of the lever bar 48. It should be appreciated that the curved slot 78 and the pin 80 cooperate to limit the pivotal movement of the lever bar 48 about the third pivot point 62.

As the hood hinge assembly 10 moves toward the extended position, the abutment surface 96 abuts against the support bar 86, and the abutment member 84 abuts against the mount bar 44, to hold the hood hinge assembly 10 against the force applied by the actuator 74. In one embodiment, the abutment surface 96 and the abutment member 84 limit the mount bar 44 in a substantially perpendicular position in relation to the base 36 such that the first pivot point 22 increases the distance between the rear corner 24 of the hood 20 and the body 14. It should also be appreciated that, in another embodiment, the relationship between the mount bar 44 and the base 36 may be adjusted such that the mount bar 44 is at an angle relative to the base 36.

In operation of the hood hinge assembly 10, when the sensor 32 of the vehicle 12 detects a vehicular impact, the sensor 32 sends a signal to the controller 34. The controller 34, in turn, sends a signal to the actuator 74, and the actuator 74 supplies a force to the lever bar 48 of the hood hinge assembly 10. Force from the actuator 74 causes destruction of the pin 72, thereby freeing the lever bar 48 for pivotal movement about the third pivot point 62 such that the hood hinge assembly 10 can move from the retracted position towards the extended position. As the lever bar 48 moves away from the body 14 of the vehicle 12, the lever bar 48 moves the mount bar 44, and thus the rear corner 24 of the hood 20, away from the body 14. As the mount bar 44 moves away from the body 14 of the vehicle 12, the support bar 86 maintains the mount bar 44 in a substantially perpendicular position relative to the base 36 such that the first pivot point 22 moves in a substantially vertical direction away from the body 14. Also, as the hood hinge assembly 10 approaches the extended position, the abutment member 84, the abutment surface 96, and the pin 80 cooperate to limit the rotation of the mount bar 44 about the second pivot point 58 and maintain the mount bar 44 substantially perpendicular to the base 36. It should be appreciated that the first pivot point 22 travels in a substantially vertical direction away from the body 14 of the vehicle 12 for increased space between the rear corner 24 of the hood 20 and the engine 19. It should also be appreciated that an object that impacts the vehicle 12 is more likely to deform the hood 20 and dissipate kinetic energy due to the hood hinge assembly 10 of the present invention.

The hood hinge assembly 10 of the present invention is substantially robust and maintains substantially stable movement. This is because the first, second, third, fourth, and fifth pivot points 22, 58, 62, 92, 94 each allow for pivotal movement, but are each restricted from linear movement. Also, the pin 80 and curved slot 78 add further support to the hood hinge assembly 10. The hood hinge assembly 10 is also substantially compact. Thus, the hood hinge assembly 10 can be more easily incorporated into a vehicle 12 without interfering with other components.

It should be appreciated that the hood hinge assembly 10 could float freely in the fore-aft and the fore-aft movement would have to be controlled by a rod in the piston actuator. It should also be appreciated that the hood hinge assembly 10 has swing stop links which package under the hinge base requiring a large cutout in the motor rail for clearance to these links, which links caused some packaging problems. It should further be appreciated that the hood hinge assembly 10 controls movement and does not require cutouts for the rod actuator.

Referring to FIGS. 5 through 12, another embodiment, according to the present invention, of the hood hinge assembly 10 is shown. Like parts of the hood hinge assembly 10 have like reference numerals increased by one hundred (100). In this embodiment, the hood hinge assembly 110 includes a base 136. The base 136 is a plate that is bent so as to define a first portion 138 and opposed second portions 140. The second portions 140 are substantially perpendicular to the first portion 138 to form a general "U" shape. The first portion 138 includes a plurality of apertures 142 (FIGS. 6 and 7) used to operatively fix the base 136 to the body 14 by a suitable mechanism such as fasteners (not shown). It should be appreciated that the base 136 could be integral to the body 14.

The hood hinge assembly 110 also includes an actuator link 198. The actuator link 198 includes a first portion 200 that is generally elongate and is adapted for pivotal attachment to the hood 20. The first portion 200 has one end 202 pivotally attached to the rear corner 24 of the hood 20 to define a pivot point 122 of the hood 20. The first portion 200 can include any suitable component for pivotally attaching to the hood 20 at the pivot point 122, such as a hinge pivot weld nut or rivet.

The actuator link 198 also includes a second portion 204. The second portion 204 is generally "L" shaped and elongate so as to define a first end 206 and a second end 208. The first end 206 is connected to the first portion 200 and the second end 208 is pivotally attached to a check link 222 to be described so as to define a pivot point 220 to be described. In the embodiment illustrated, the actuator link 198 includes an attachment flange 176 extending perpendicularly for a function to be described. It should be appreciated that the actuator link 198 is a monolithic structure being integral, unitary, and one-piece.

The hood hinge assembly 110 also includes a mount link or bar 144. The mount bar 144 is generally elongate and is adapted for pivotal movement. The mount bar 144 has a first end 146 and a second end 147. The first end 146 is pivotally attached to the first portion 200 of the actuator link 198 to define a pivot point 210 and the second end 147 is pivotally attached to a support link or bar 186 to be described. The mount bar 144 can include any suitable component for pivotally attaching to the actuator link 198 and the support bar 186 such as a hinge pivot weld nut, rivet, or bushing (not shown).

The hood hinge assembly 110 includes a lever bar 148. The lever bar 148 is generally flat and elongate so as to define a first end 150 and a second end 152. The first end 150 of the lever bar 148 is pivotally attached to the mount bar 144 so as to define a pivot point 158. The axis of the pivot point 158 extends through a middle portion (FIGS. 10 and 11) of the mount bar 144. The second end 152 of the lever bar 148 is pivotally attached to the second portion 140 of the base 136 so as to define a pivot point 162. The lever bar 148 may include any suitable component for pivotally attaching to the mount bar 144 and the base 136. In the embodiment illustrated, the mount bar 144 is restricted against substantially all linear movement relative to the lever bar 148 at the pivot point 158. Likewise, the lever bar 148 is restricted against substantially all linear movement relative to the base 136 at the pivot point 162. It should be appreciated that the hood hinge assembly 110 is more stable when moving from the retracted position toward the extended position.

The hood hinge assembly 110 also includes a support link or bar 186. The support bar 186 is generally planar and elongate. The support bar 186 includes a first portion 188 and a second portion 190. The second portion 190 is disposed at an angle relative to the first portion 188. The first portion 188 of the support bar 186 is pivotally attached to the mount bar 144 at a pivot point 192. The second portion 190 of the support bar 186 is pivotally attached to the second portion 140 of the base 136 at a pivot point 194. The support bar 186 is generally disposed between the lever bar 148 and the second portion 140 of the base 136. In the embodiment illustrated, the support bar 186 is restricted against substantially all linear movement relative to the mount bar 144 at the pivot point 192. Likewise, the support bar 186 is restricted against substantially all liner movement relative to the base 136 at the pivot point 194. It should be appreciated that the hood hinge assembly 110 is more stable when moving from the retracted position toward the extended position.

Figure 8:
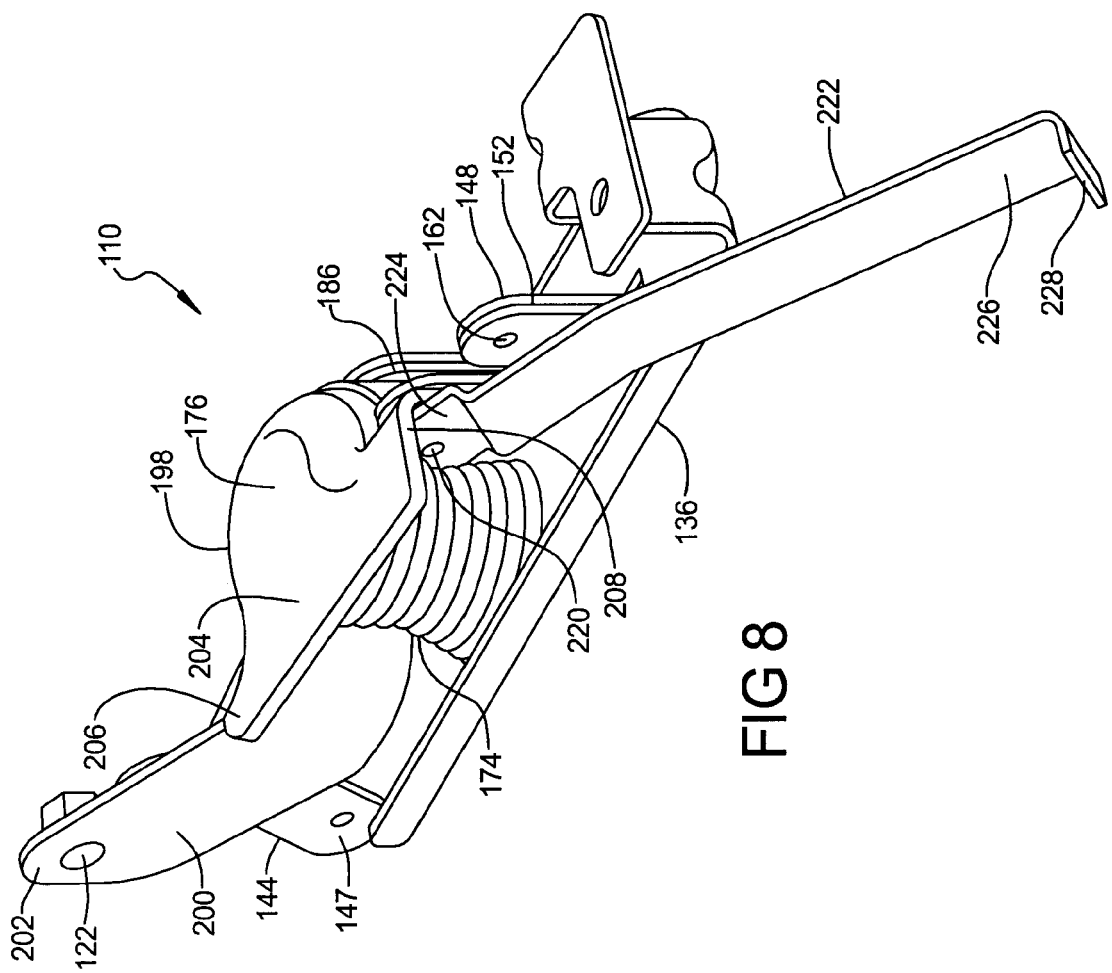
FIG. 8 is a rear perspective view of the hood hinge assembly of FIG. 5 illustrated in a retracted position.
Figure 9:
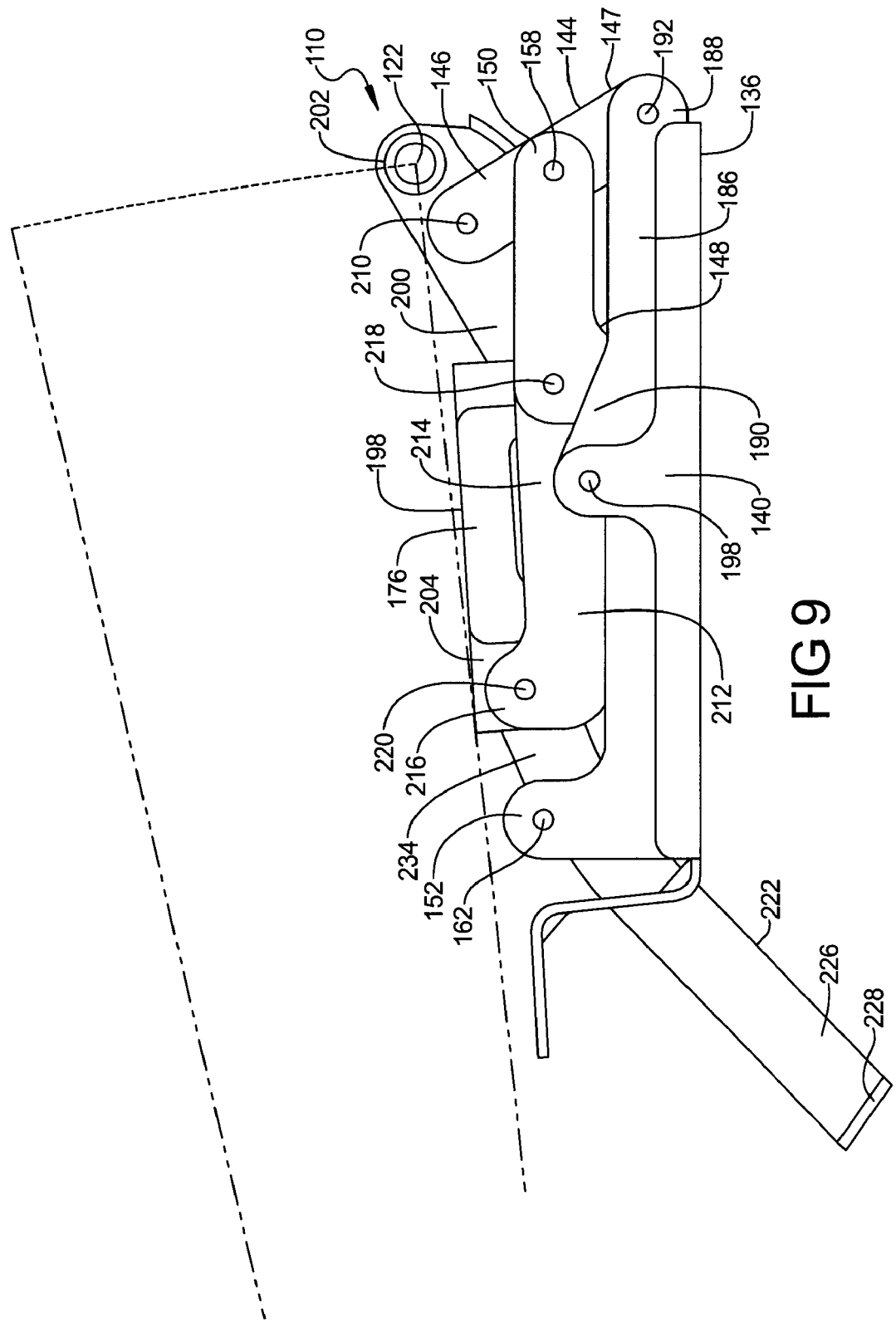
FIG. 9 is a front elevational view of the hood hinge assembly of FIG. 5 illustrated in the retracted position and illustrated with a hood of the vehicle in an opened and closed position.
Figure 10:
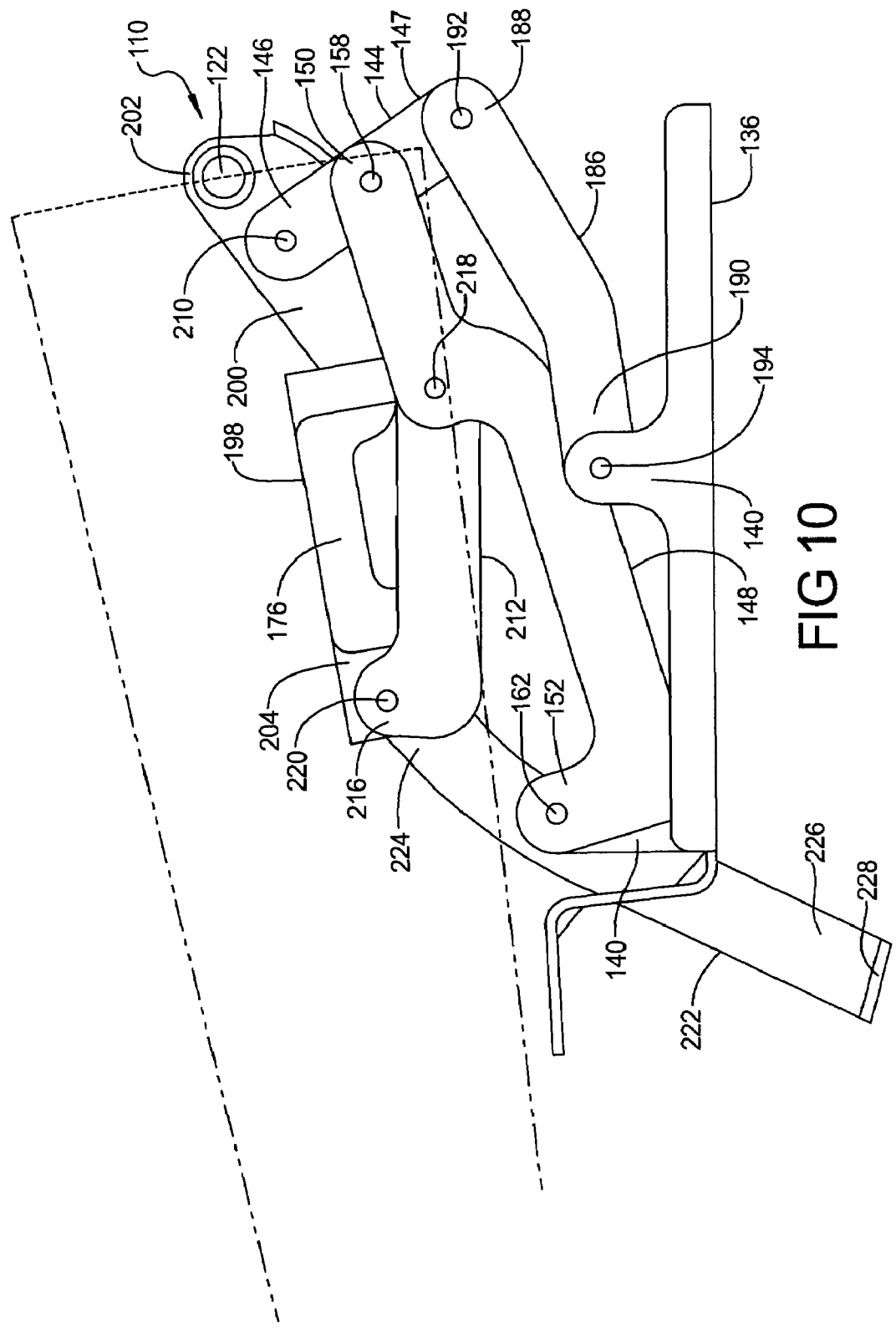
FIG. 10 is a front elevational view of the hood hinge assembly of FIG. 5 illustrated in a partially extended position.
Figure 11:
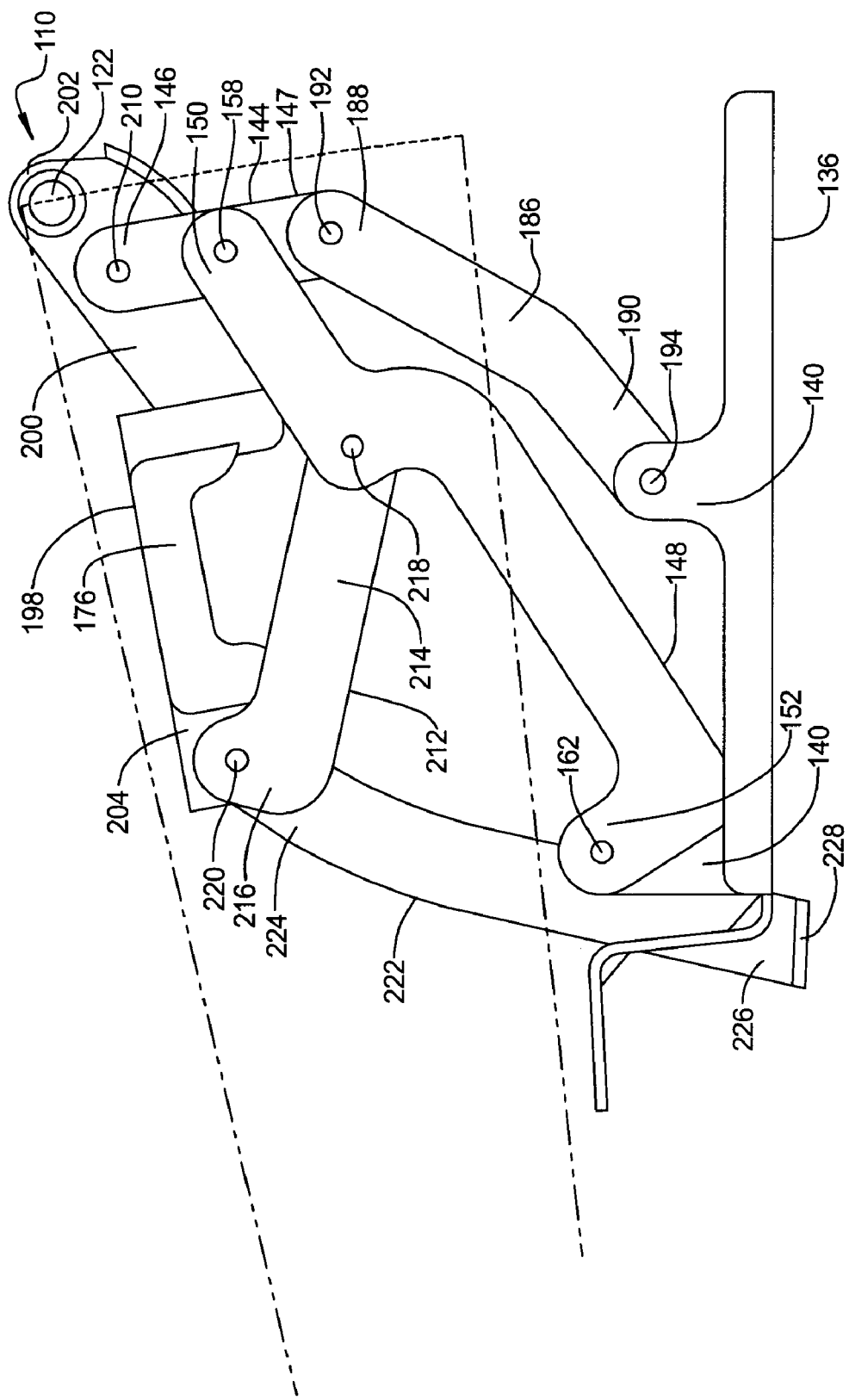
FIG. 11 is a front elevational view of the hood hinge assembly of FIG. 5 illustrated in an extended position.
Figure 12:
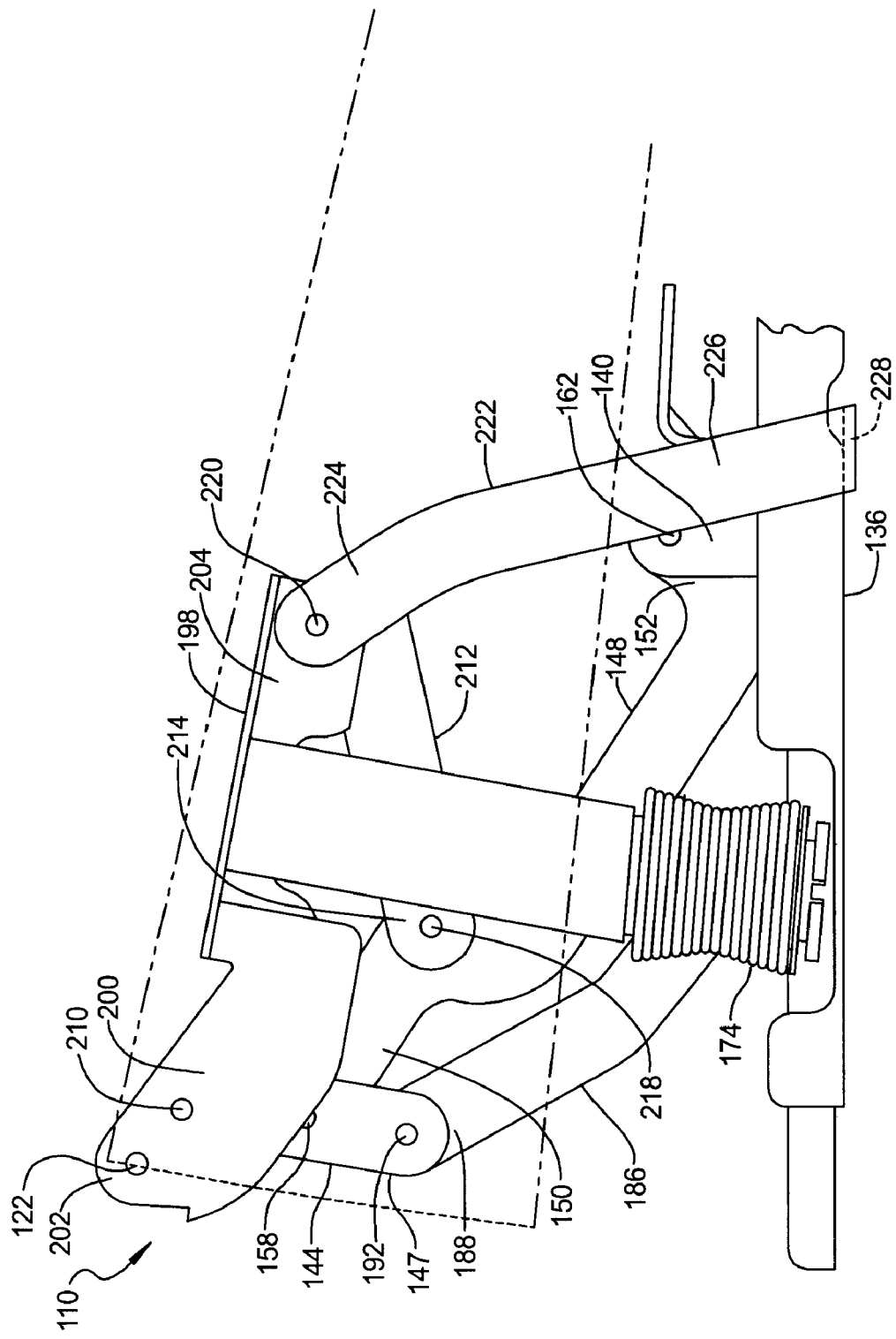
FIG. 12 is a rear elevational view of the hood hinge assembly of FIG. 5 illustrated in an extended position.

The hood hinge assembly 110 includes an actuator 174 (FIGS. 8 and 12). The actuator 174 is operable to pivot the actuator link 198 to move the hood hinge assembly 110 from the retracted position toward the extended position. The actuator 174 is operatively attached to the attachment flange 176 such as by a pivotal attachment. The actuator 174 is operable to supply an actuation force to the actuator link 198 and lever bar 148 to thereby pivot the lever bar 148 about the pivot point 162. In this embodiment, the actuator 174 is a bellows actuator. The bellows actuator has a stainless steel bellows and a pyrotechnic (not shown) disposed internally within the bellows. The pyrotechnic is electrically connected to an igniter (not shown). It should be appreciated that, when the bellows is activated or ignited, an explosion causes the bellows to expand in a vector direction.

The hood hinge assembly 110 also includes a control link 212 to assist in controlling a vertical force by the actuator 174. The control link 212 is generally planar and elongate. The control link 212 includes a first portion 214 and a second portion 216. The second portion 216 is disposed at an angle relative to the first portion 214. The first portion 214 of the control link 212 is pivotally attached to the first portion 150 of the lever bar 148 at a pivot point 218. The second portion 216 of the control link 212 is pivotally attached to the actuator link 198 at a pivot point 220. The control link 212 is generally disposed between the actuator link 198 and the lever bar 148.

The hood hinge assembly 110 also includes a check link 222 to assist in front impact after the actuator 174 is deployed. The check link 222 is generally planar and elongate. The check link 222 includes a first portion 224 and a second portion 226. The second portion 226 is disposed at an angle relative to the first portion 224. The first portion 224 of the check link 222 is pivotally attached to the actuator link 198 at the pivot point 220. The second portion 226 of the check link 222 is disposed through a slot (not shown) in the body 14 of the vehicle 12 and an end or abutment member 228 of the second portion 226 of the check link 222 will engage the body 14 after the actuator 174 has deployed. The check link 222 is generally disposed between the second portion 140 of the base 136 and the body 14 of the vehicle 12.

In operation of the hood hinge assembly 110, when the sensor 32 of the vehicle 12 detects a vehicular impact, the sensor 32 sends a signal to the controller 34. The controller 34, in turn, sends a signal to the actuator 174, and the actuator 174 supplies a force to the actuator link 198 of the hood hinge assembly 110. Force from the actuator 174 causes the actuator link 198 to move upwardly, thereby moving the mount bar 144 for pivotal movement such that the hood hinge assembly 110 moves from the retracted position towards the extended position. As the actuator link 198 and mount bar 144 move away from the body 14 of the vehicle 12, the actuator link 198 and the mount bar 144 move the lever bar 148 and support bar 186, and thus the rear corner 24 of the hood 20, away from the body 14. As the actuator link 198 moves away from the body 14 of the vehicle 12, the pivot point 122 moves in a substantially vertical direction away from the body 14. Also, as the hood hinge assembly 110 approaches the extended position, the control link 212 limits the rotation of the mount bar 144. It should be appreciated that the pivot point 122 travels in a substantially vertical direction away from the body 14 of the vehicle 12 for increased space between the rear corner 24 of the hood 20 and the engine 19. It should also be appreciated that an object that impacts the vehicle 12 is more likely to deform the hood 20 and dissipate kinetic energy due to the hood hinge assembly 110 of the present invention.

Accordingly, the hood hinge assembly 110 of the present invention uses the same concept of using four bar links to control the fore-aft movement of the hood 20 while lifting the rear of the hood 20, but also considers the direction of force caused by the bellows actuator 174. The hood hinge assembly 110 shows supporting a bellows actuator 174. The hood hinge assembly 110 controls the bellows deployment vertically while still maintaining the rear hood lift path. The hood hinge assembly 110 has fore-aft control and is easy to reset after deployment.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A hood hinge assembly for operatively attaching a hood to a vehicle comprising:
    a base adapted to be operatively fixed to the vehicle;
    an actuator link adapted for pivotal attachment to the hood at a first pivot point;
    a mount link pivotally attached to said actuator link at a second pivot point;
    a lever link pivotally attached to said mount link at a third pivot point and pivotally attached to said base at a fourth pivot point;
    an actuator operable to pivot said actuator link and said lever link to thereby move said first pivot point away from the vehicle;
    a support link pivotally attached to said mount link at a fifth pivot point, said support link operable to support said mount link at said fifth pivot point as said mount link pivots about said second pivot point;
    a check link pivotally connected to said actuator link to limit the movement of said actuator link after said actuator has deployed; and
    wherein said check link includes at least one abutment member operable to abut against a body of the vehicle.

2. A hood hinge assembly for operatively attaching a hood to a vehicle comprising:
    a base adapted to be operatively fixed to the vehicle;
    an actuator link adapted for pivotal attachment to the hood at a first pivot point;
    a mount link pivotally attached to said actuator link at a second pivot point;
    a lever link pivotally attached to said mount link at a third pivot point and pivotally attached to said base at a fourth pivot point;
    an actuator operable to pivot said actuator link and said lever link to thereby move said first pivot point away from the vehicle;
    a support link pivotally attached to said mount link at a fifth pivot point, said support link operable to support said mount link at said fifth pivot point as said mount link pivots about said second pivot point; and
    a control link pivotally connected to said actuator link and pivotally connected to said lever link to assist in controlling a vertical force of said actuator.

3. A hood hinge assembly as set forth in claim 2 wherein said control link is disposed between said actuator link and said lever link.

4. A hood hinge assembly for operatively attaching a hood to a vehicle comprising:
    a base adapted to be operatively fixed to the vehicle;
    an actuator link adapted for pivotal attachment to the hood at a first pivot point;
    a mount link pivotally attached to said actuator link at a second pivot point;
    a lever link pivotally attached to said mount link at a third pivot point and pivotally attached to said base at a fourth pivot point;
    an actuator operable to pivot said actuator link and said lever link to thereby move said first pivot point away from the vehicle;
    a support link pivotally attached to said mount link at a fifth pivot point, said support link operable to support said mount link at said fifth pivot point as said mount link pivots about said second pivot point;
    a check link pivotally connected to said actuator link to limit the movement of said actuator link after said actuator has deployed; and
    wherein said actuator link has a first end connected to the hood and a second end connected to said check link.

5. A hood hinge assembly as set forth in claim 4 wherein said actuator link includes an attachment flange disposed between said first end and said second end for cooperating with said actuator.

6. A hood hinge assembly for operatively attaching a hood to a vehicle comprising:
    a base adapted to be operatively fixed to the vehicle;
    an actuator link adapted for pivotal attachment to the hood at a first pivot point;
    a mount link pivotally attached to said actuator link at a second pivot point;
    a lever link pivotally attached to said mount link at a third pivot point and pivotally attached to said base at a fourth pivot point;
    an actuator operable to pivot said actuator link and said lever link to thereby move said first pivot point away from the vehicle;
    a support link pivotally attached to said mount link at a fifth pivot point, said support link operable to support said mount link at said fifth pivot point as said mount link pivots about said second pivot point; and
    wherein said actuator is attached to said actuator link and said base.

7. A hood hinge assembly for operatively attaching a hood to a vehicle comprising:
    a base adapted to be operatively fixed to the vehicle;
    an actuator link adapted for pivotal attachment to the hood at a first pivot point;
    a mount link pivotally attached to said actuator link at a second pivot point;
    a lever link pivotally attached to said mount link at a third pivot point and pivotally attached to said base at a fourth pivot point;
    an actuator operable to pivot said actuator link and said lever link to thereby move said first pivot point away from the vehicle;
    a support link pivotally attached to said mount link at a fifth pivot point, said support link operable to support said mount link at said fifth pivot point as said mount link pivots about said second pivot point; and
    wherein said actuator is of a bellows type.

8. A hood hinge assembly for operatively attaching a hood to a vehicle comprising:
    a base adapted to be operatively fixed to the vehicle;
    an actuator link adapted for pivotal attachment to the hood at a first pivot point, said actuator link having an actuator flange;

a mount link pivotally attached to said actuator link at a second pivot point;

a lever link pivotally attached to said mount link at a third pivot point and pivotally attached to said base at a fourth pivot point;

an actuator attached to said actuator flange of said actuator link and said base and being operable to pivot said actuator link and said lever link to thereby move said first pivot point away from the vehicle;

a support link pivotally attached to said mount link at a fifth pivot point, wherein said actuator comprises a bellows type actuator cooperating with said actuator link to move said actuator link away from the vehicle as said actuator is deployed;

a check link pivotally connected to said actuator link to limit the movement of said actuator link after said actuator has deployed; and wherein said check link includes at least one abutment member operable to abut against a body of the vehicle.

9. A hood hinge assembly for operatively attaching a hood to a vehicle comprising:

a base adapted to be operatively fixed to the vehicle;

an actuator link adapted for pivotal attachment to the hood at a first pivot point, said actuator link having an actuator flange;

a mount link pivotally attached to said actuator link at a second pivot point;

a lever link pivotally attached to said mount link at a third pivot point and pivotally attached to said base at a fourth pivot point;

an actuator attached to said actuator flange of said actuator link and said base and being operable to pivot said actuator link and said lever link to thereby move said first pivot point away from the vehicle;

a support link pivotally attached to said mount link at a fifth pivot point, wherein said actuator comprises a bellows type actuator cooperating with said actuator link to move said actuator link away from the vehicle as said actuator is deployed; and a control link pivotally connected to said actuator link and pivotally connected to said lever link to assist in controlling a vertical force of said actuator.

10. A hood hinge assembly as set forth in claim 9 wherein said control link is disposed between said actuator link and said lever link.

11. A hood hinge assembly for operatively attaching a hood to a vehicle comprising:

a base adapted to be operatively fixed to the vehicle;

an actuator link adapted for pivotal attachment to the hood at a first pivot point, said actuator link having an actuator flange;

a mount link pivotally attached to said actuator link at a second pivot point;

a lever link pivotally attached to said mount link at a third pivot point and pivotally attached to said base at a fourth pivot point;

an actuator attached to said actuator flange of said actuator link and said base and being operable to pivot said actuator link and said lever link to thereby move said first pivot point away from the vehicle;

a support link pivotally attached to said mount link at a fifth pivot point, wherein said actuator comprises a bellows type actuator cooperating with said actuator link to move said actuator link away from the vehicle as said actuator is deployed;

a check link pivotally connected to said actuator link to limit the movement of said actuator link after said actuator has deployed; and wherein said actuator link has a first end connected to the hood and a second end connected to said check link.

12. A hood hinge assembly as set forth in claim 11 wherein said attachment flange is disposed between said first end and said second end for cooperating with said actuator.

13. A vehicle comprising:

a body;

a hood;

a base operatively fixed to said body of the vehicle;

an actuator link pivotally attached to said hood at a first pivot point;

a mount link pivotally attached to said actuator link at a second pivot point;

a lever link pivotally attached to said mount link at a third pivot point and pivotally attached to said base at a fourth pivot point;

an actuator operable to pivot said actuator link and said lever link to thereby move said first pivot point away from said body of the vehicle;

a support link pivotally attached to said mount link at a fifth pivot point, wherein said actuator cooperates with said actuator link to move said actuator link away from the vehicle as said actuator is deployed; and a control link pivotally connected to said actuator link and pivotally connected to said lever link to assist in controlling a vertical force of said actuator.

* * * * *